Figure 1:
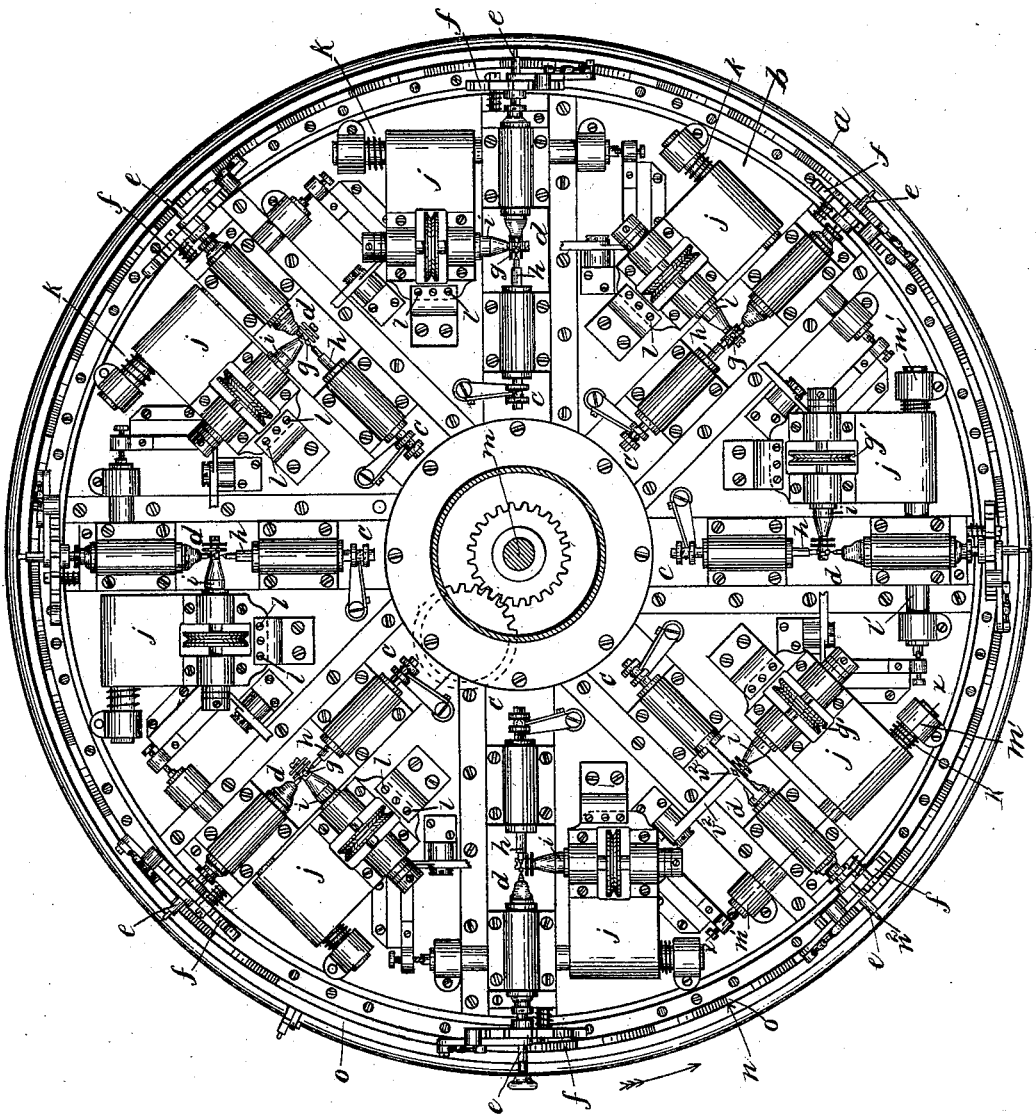

(No Model.) 8 Sheets—Sheet 1.

E. A. MARSH.
WATCH PINION CUTTING MACHINE.

No. 359,323. Patented Mar. 15, 1887.

WITNESSES.
INVENTOR.

(No Model.) 8 Sheets—Sheet 2.
E. A. MARSH.
WATCH PINION CUTTING MACHINE.

No. 359,323. Patented Mar. 15, 1887.

WITNESSES.
A. D. Harrison
H. M. Harmon

INVENTOR.
E. A. Marsh
by Wright Brown & Crosby
Attys.

(No Model.) 8 Sheets—Sheet 4.

E. A. MARSH.
WATCH PINION CUTTING MACHINE.

No. 359,323. Patented Mar. 15, 1887.

Fig. 5.ª

WITNESSES
A. D. Harrison,
H. M. Harmon

INVENTOR
E. A. Marsh
by Might, Bonns, & Crosley
Attys (No Model.) 8 Sheets—Sheet 5.
E. A. MARSH.
WATCH PINION CUTTING MACHINE.

No. 359,323. Patented Mar. 15, 1887.

WITNESSES.
INVENTOR.

(No Model.) 8 Sheets—Sheet 6.

E. A. MARSH.
WATCH PINION CUTTING MACHINE.

No. 359,323. Patented Mar. 15, 1887.

WITNESSES.
A. D. Harrison.
H. M. Harmon

INVENTOR.
E. A. Marsh
by Wright, Brown & Crosby
Attys.

(No Model.) 8 Sheets—Sheet 7.
E. A. MARSH.
WATCH PINION CUTTING MACHINE.

No. 359,323. Patented Mar. 15, 1887.

WITNESSES.
INVENTOR.

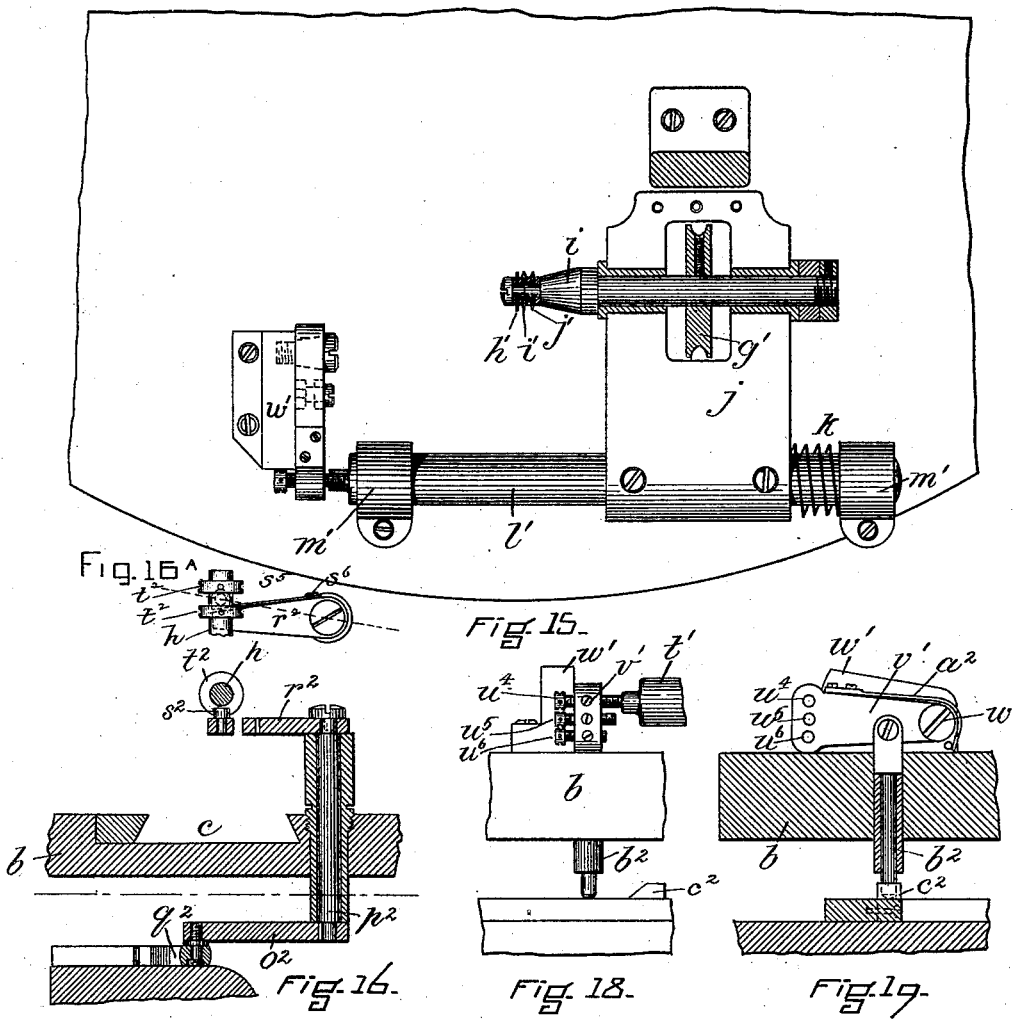

UNITED STATES PATENT OFFICE.

EDWARD A. MARSH, OF NEWTON, MASSACHUSETTS.

WATCH-PINION-CUTTING MACHINE.

SPECIFICATION forming part of Letters Patent No. 359,323, dated March 15, 1887.

Application filed December 6, 1886. Serial No. 220,734. (No model.)

*To all whom it may concern:*

Be it known that I, EDWARD A. MARSH, of Newton, in the county of Middlesex and State of Massachusetts, have invented certain new and useful Improvements in Pinion-Cutting Machines, of which the following is a specification.

The small number of teeth in the pinions of watches (usually seven to twelve) and the smallness of the teeth, as compared with the intervening spaces, makes the cutting of the teeth an operation of considerable difficulty, requiring several cuts for removing the metal and giving the proper form to the teeth, which also must be as smooth as possible and true with the staff.

A common method of cutting watch-pinions is to first cut through the blanks with a plain cutter or saw, which is mounted on a running spindle, and then bring into action a second spindle on which is a cutter which will remove additional stock and give an approximation to the form of a finished tooth, and, finally, to subject the blank to the action of the finishing-cutter. In work of the better grades the finishing-cutter is run through a second time, and sometimes a fourth cutter is used. Ordinarily the several cutters are mounted on separate spindles, which are successively brought into operative position; and machines have also been constructed in which the pinion-blank and its necessary indexing mechanism are moved from one cutter to another; but to make machines of either of the above types automatic in their action involves very much of complication. Cutting-machines have also been made in which all the required cutters are mounted side by side on a single spindle or arbor; but in machines of all the foregoing types the time required to complete the cutting of a pinion cannot of course be less than that consumed by one of the cutters acting successively upon each and every tooth of the pinion, while most machines require the time needed for the three or more cutters to act successively, and also require that the machine be stopped at the completion of each pinion, that it may be removed and a fresh blank supplied.

As suggested above, an improved form of machine has been used which is constructed with a number of cutters, each on an independent arbor or spindle, and a surplus of pinion-holding devices, which are so arranged as to be moved into operative relation with the successive cutters, which all operate simultaneously on different pinions or blanks, while at the same time the operator is removing a completed pinion from the extra holder and supplying it with a fresh blank; but of course a certain amount of time is necessarily consumed in moving the blanks from one cutter to another; and, moreover, it is necessary that the several cutters should be kept in a definite and accurate relation to each other, in order that as they supplement each other there shall be a perfect alignment. This form of machine (a type of which is shown in Letters Patent of the United States, No. 350,142, granted to Frank Leman, October 5, 1886) demands the most perfect adjustment of its several parts, and is of necessity quite complicated in its action and construction.

The object of my invention is to provide a pinion-cutting machine which shall be automatic in action, simple in construction, rapid and accurate in operation, and which shall be capable of easy adjustment, and readily changed to adapt it to different kinds of work, and, further, to be capable of doing different kinds of work at the same time.

To this end my invention consists, first, in the combination of a stationary bed, a circular turret or carriage having a continuous rotary motion, a plurality of pinion-carrying slides, each of which has an independent reciprocating motion, and a corresponding number of cutter-spindles, each of which maintains its operative relation to a single pinion-carrying slide; also, the combination of a stationary bed, a circular turret or carriage having a continuous rotary motion, a plurality of pinion-carrying slides, each of which has an independent reciprocating motion, and a corresponding number of cutter-spindles, each of which maintains its operative relation to a single pinion-carrying slide, each cutter-spindle carrying a group or series of cutters and suitable means for bringing each cutter of the series successively into operative position; also, the combination of a stationary bed, a circular turret or carriage having a continuous rotary motion, a plurality of pinion-carrying slides, each of which has an independent reciprocating motion, and a corresponding number of cutter-spindles, each of which maintains its operative relation to a single pinion-carrying slide, each cutter-spindle carrying a group or series of cutters, and suitable means for bringing each cutter of the series successively into operative position, and means for withdrawing the cutters from contact with the pinions during their return motion, also during a definite portion of the rotation of the turret or carriage.

It consists, further, in the plurality of pinion-carrying slides, each having an indexed spindle and operating devices therefor, in combination with a series of stationary lugs, which by their imposition in the orbits of the latch-arm and ratchet-arm shall cause a step-by-step motion of the index; also, in a pinion-cutting machine, a plurality of slides, cutter-spindles carrying groups or sets of cutters, means for withdrawing the cutters from the pinions, and indexing devices, &c., so arranged in relation to each other that similar motions of the several sets shall be successive and not in unison; also, in means for so adjusting the indexing mechanism as to cut different kinds of pinions at the same time; also, in means for releasing and ejecting the finished pinions, &c.; also, in means for automatically supplying fresh blanks to the pinion-holding spindles; also, in various details, all of which I will now proceed to describe by reference to the accompanying drawings, forming a part of this specification, in which—

Figure 2:
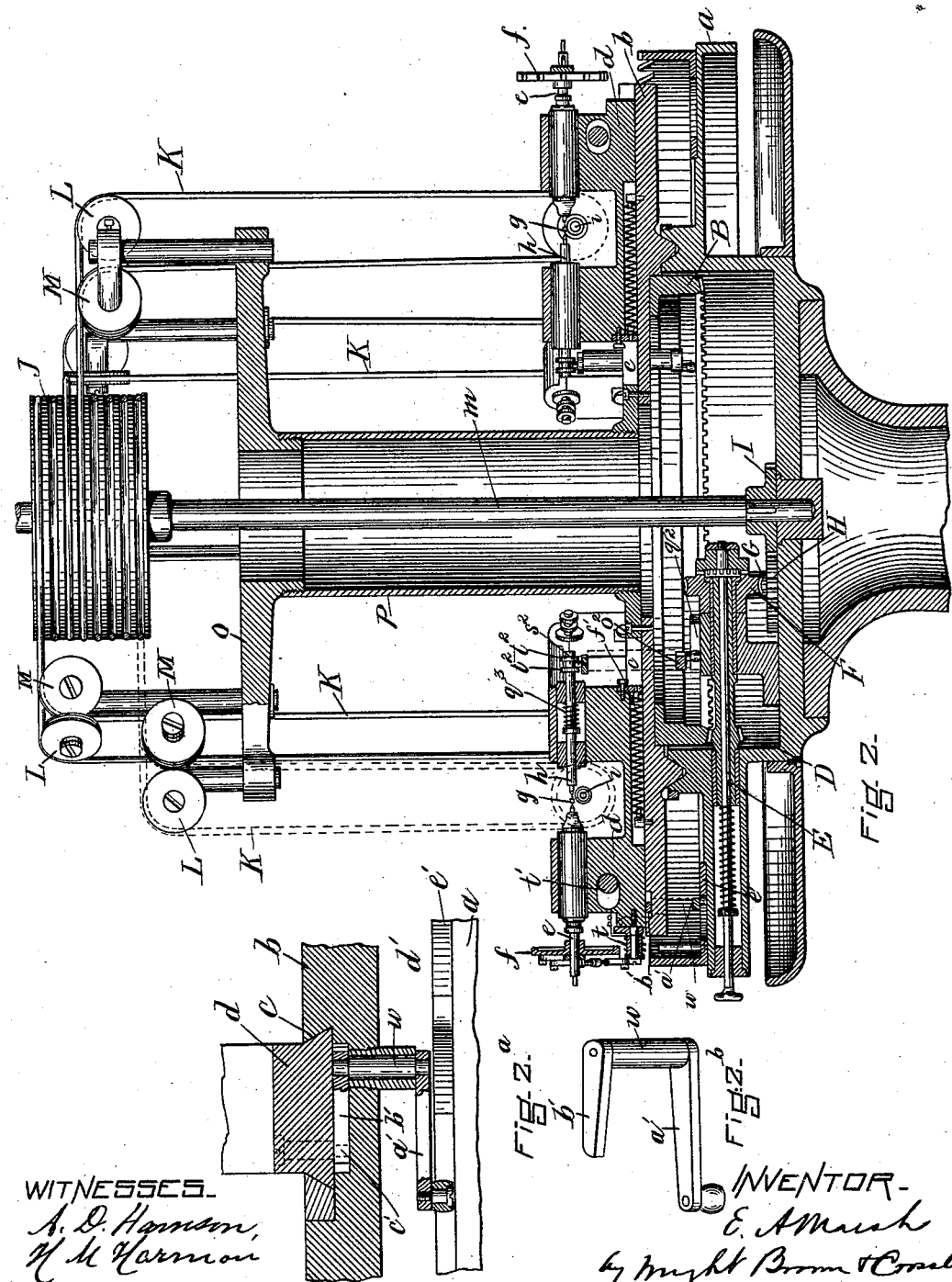
Figure 3:
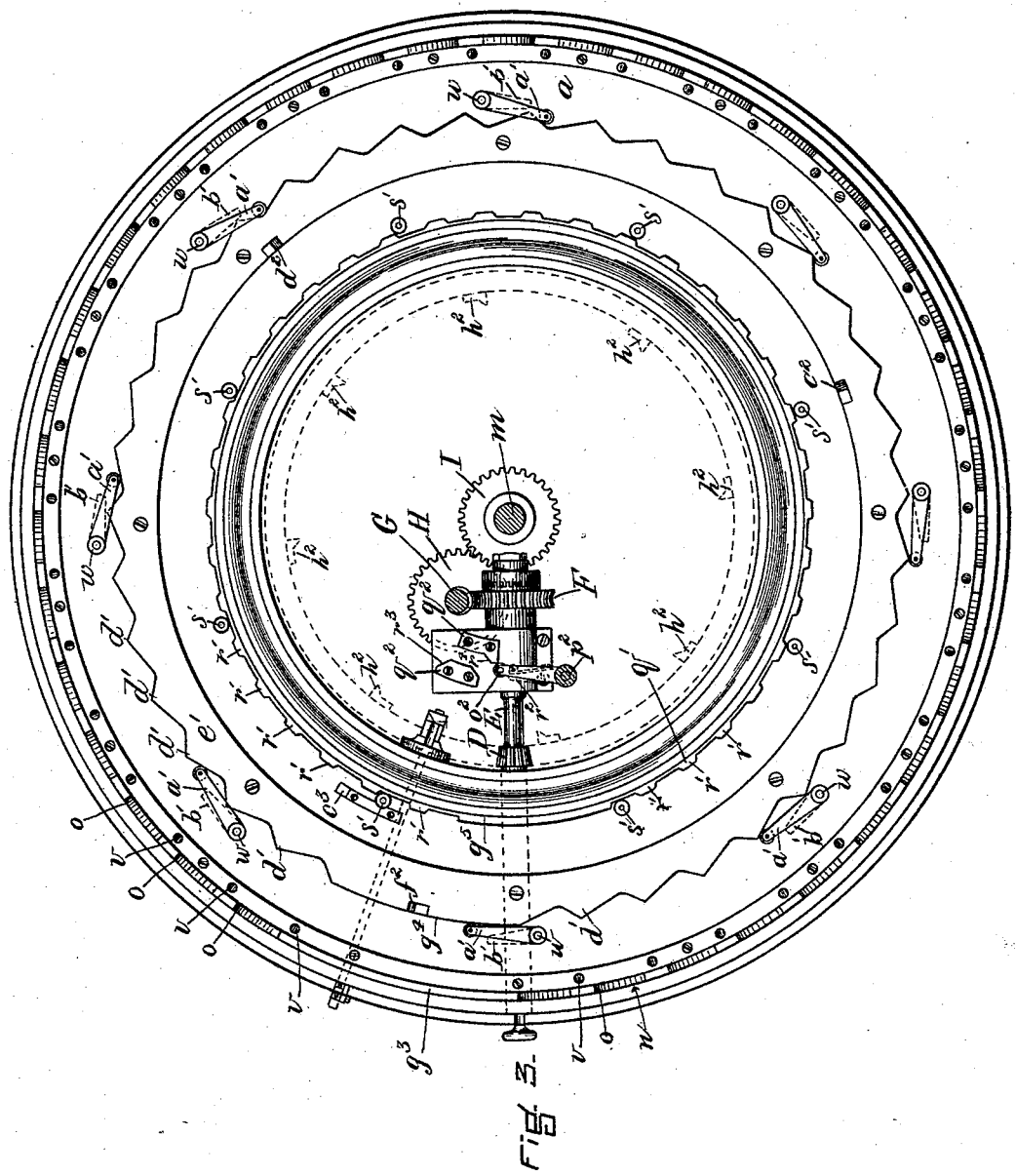
Figure 4:
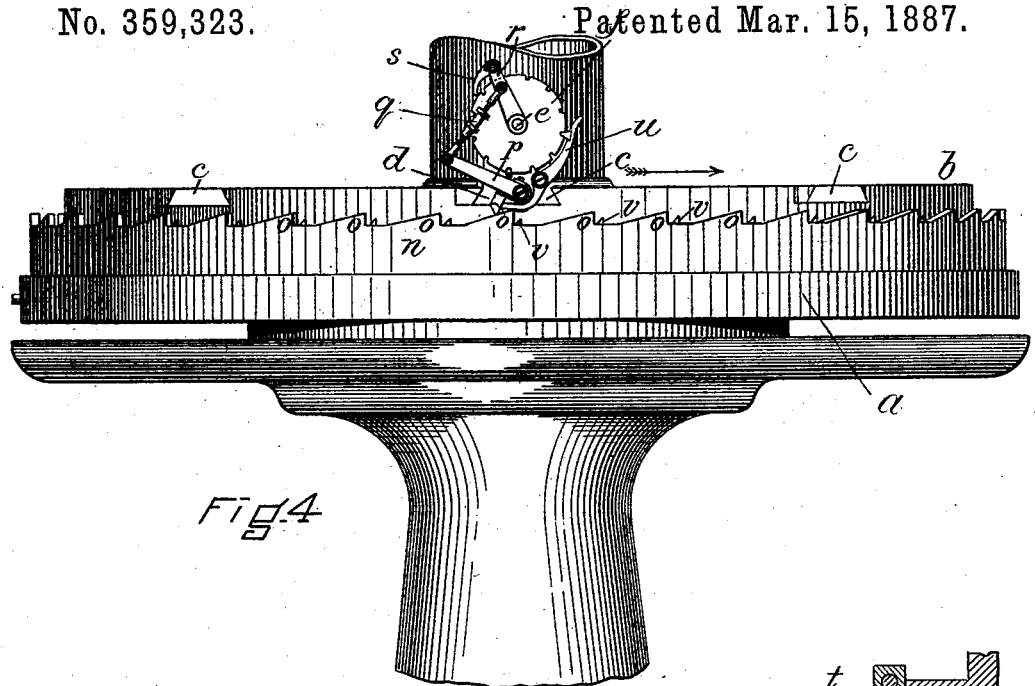
Figure 5:
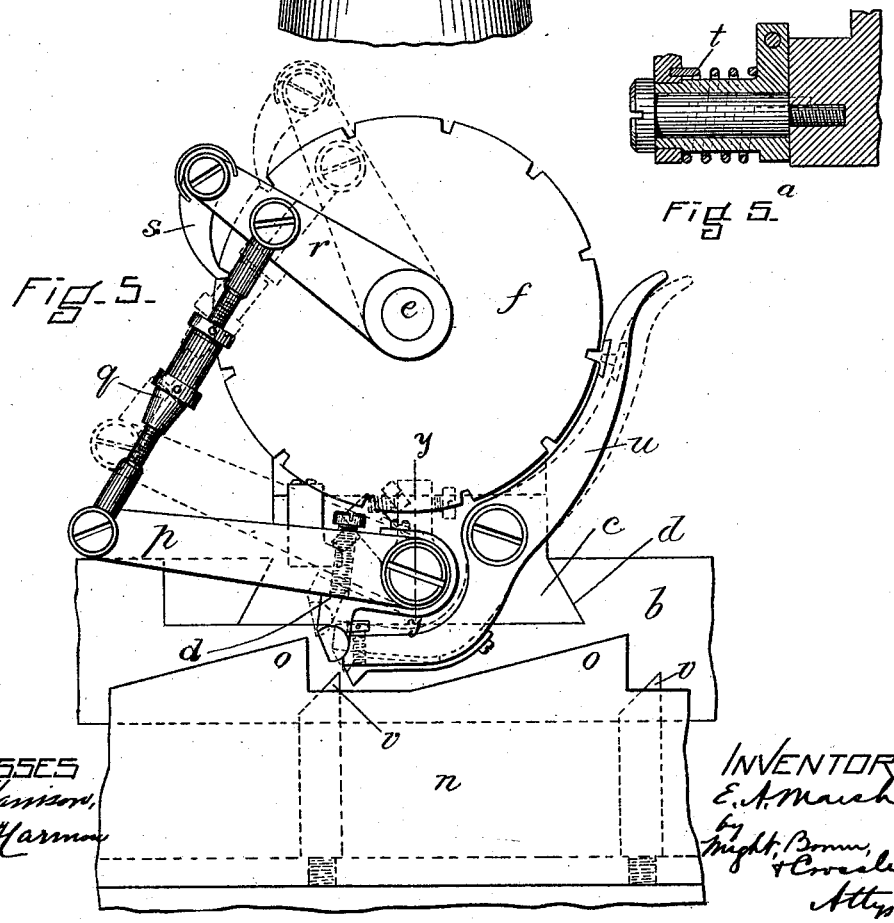
Figure 6:
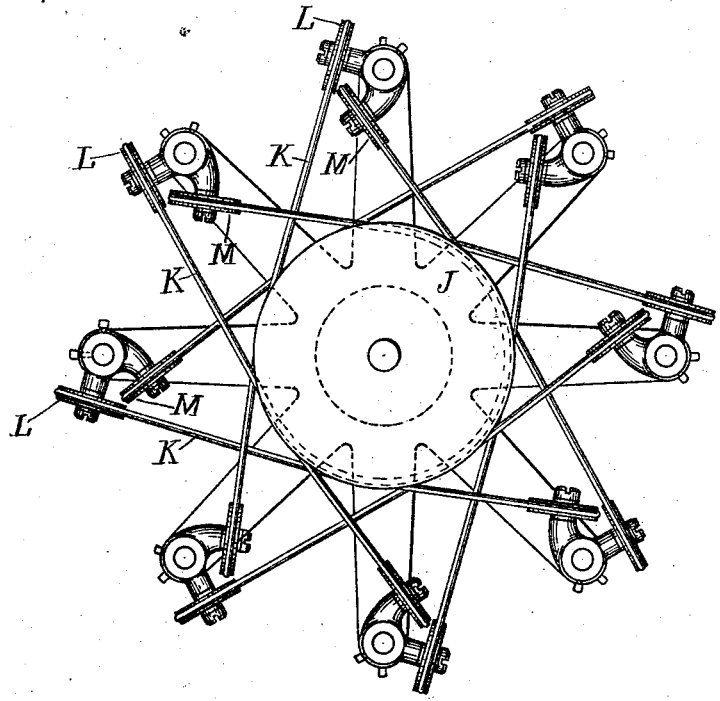
Figure 7:
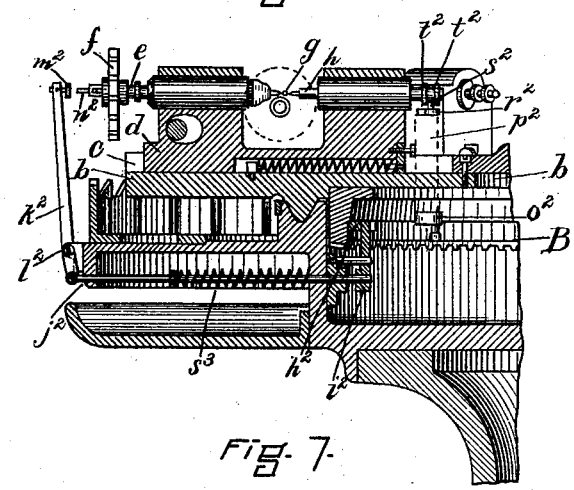
Figure 9:
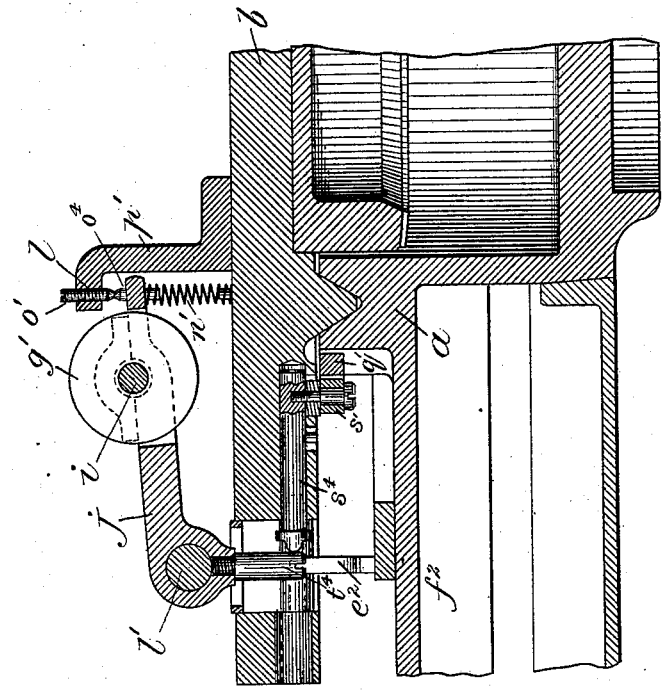
Figure 8:
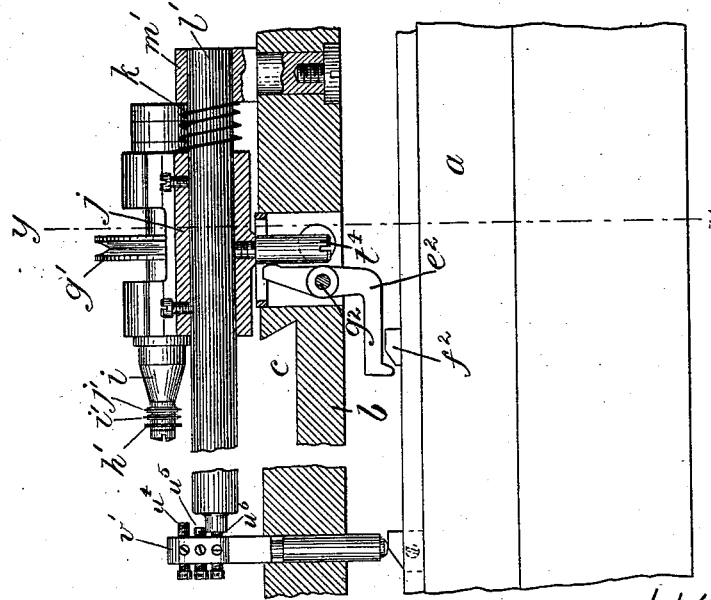
Figures 10, 11:
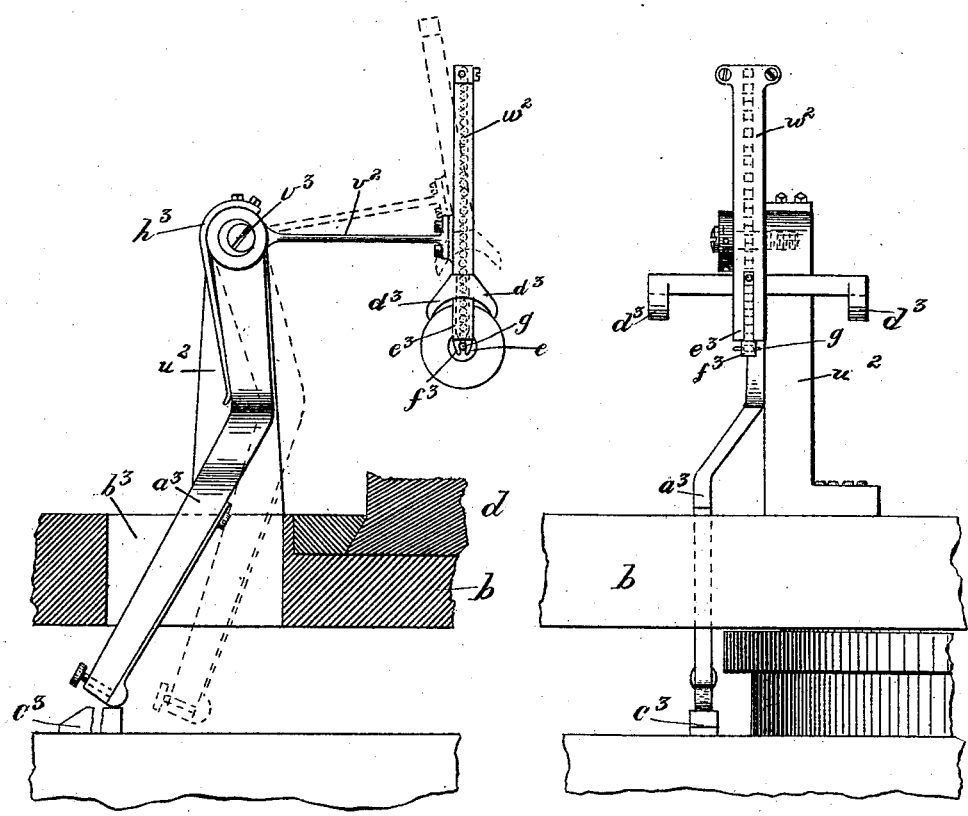
Figures 13, 14:
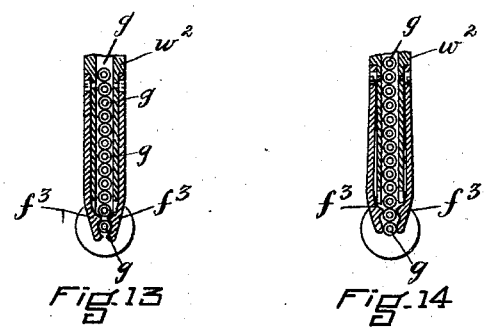
Figure 12:
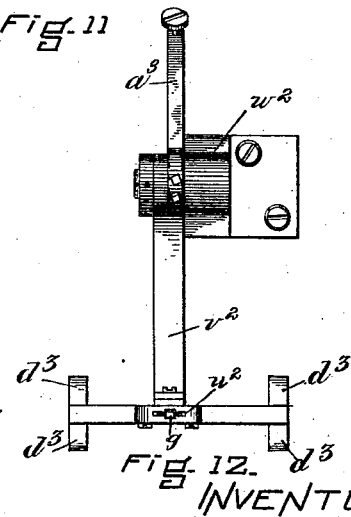

Figure 1 represents a top plan view of my improved machine. Fig. 2 represents a vertical section of the same. Figs. 2$^a$ and 2$^b$ represent detail views of a part of a pinion-carrying slide and its actuating-levers. Fig. 3 represents a top view of the fixed bed of the machine with the rotating carriage removed. Fig. 4 represents a side elevation of the bed and carriage, parts of the mechanism being removed. Fig. 5 represents an enlarged view of the indexing devices. Fig. 5$^a$ represents a section on line $y\,y$, Fig. 5. Fig. 6 represents a top view of a portion of the machine, showing the driving-belts and guide-pulleys therefor. Fig. 7 represents a vertical section through one of the blank-carrying slides and portions of the carriage and bed. Fig. 8 represents a section on the line $x\,x$, Fig. 1. Fig. 9 represents a section on line $y\,y$, Fig. 8. Figs. 10, 11, 12, 13, and 14 represent details of the blank-supplying devices. Fig. 15 represents a plan view of the cutter-arbor, its supporting-carriage, and the movable stops therefor. Figs. 16 and 17 show the mechanism for operating the tail-stock. Fig. 16$^a$ represents a top view of the lever $r^2$ and a part of the tail-stock spindle shown in Fig. 16. Figs. 18 and 19 represent details of the cutter-adjusting mechanism. Figs. 20, 21, and 22 represent a set of cutters in the different positions it assumes. Figs. 23 and 24 represent a completed pinion.

In the drawings, $a$ represents a circular frame or bed, which supports the operative parts of the machine, and is mounted on a suitable support, which is preferably a pedestal or column, as shown in Fig. 4. Mounted to rotate on the bed $a$ is a circular turret or carriage, $b$, which is continuously rotated by means hereinafter described, the carriage having a circular rib on its under side, which fits and rotates in a circular grooved track on the bed $a$. The rotary carriage is provided with a concentric ring, B, the lower edge of which is cut as a bevel-gear. With said gear meshes a bevel-pinion or small gear, D, on a shaft, E, journaled in a bearing on the bed $a$. Said shaft has a worm-gear, F, which meshes with a worm on a short vertical shaft, G, having at its lower end a gear, H, meshing with a gear, I, affixed to the vertical driving-shaft $m$ at the center of the carriage. The rotation of the shaft rotates the carriage in the direction indicated by the arrow in Fig. 1.

The shaft $m$ has a pulley, J, above the carriage, and on said pulley run the belts K, that rotate the cutter-spindles, hereinafter described. Each belt K runs over two loose pulleys, L M, said pulleys being supported by standards on a frame, O, supported by a tubular standard, P, on the carriage. The arrangement of the pulleys L M with relation to the driving-shaft is shown in Fig. 6.

In or upon the upper surface of the rotary carriage are a series of radial guides, $c$, in which are fitted slides $d$, each carrying a head-stock having a spindle, $e$. The inner ends of the spindles $e$ have tapered holes, each adapted to receive the staff of a pinion-blank, $g$, the said blanks being supplied to the spindles preferably by automatic means, hereinafter described, and forced into the spindles by longitudinally-movable tail-stock spindles $h$, mounted in tail-stocks on the slides $d$ in line with the head-stock spindles $e$. The means for operating the tail-stock spindles will be described hereinafter.

To the outer ends of the pinion-holding spindles are affixed index-wheels $f$, each having teeth or notches corresponding in number to the number of teeth or leaves to be cut in the pinion-blanks.

Affixed to the bed $a$ is a circular flange, $n$, having a series of fixed projections or inclines, $o$, which act on levers $p$, pivoted to the outer ends of the slides $d$, each projection raising a lever $p$ when the slide carrying said lever passes by the projection. The outer ends of the levers $p$ are connected by rods $q$ with arms $r$, mounted on the outer ends of the spindles $e$, and having pivoted pawls $s$ on their outer ends, formed to engage the teeth or notches of the index-wheels $f$. Each projection raises the lever $p$ passing over it to the position shown in dotted lines in Fig. 5. After the lever $p$ has passed over the projection which raised it a spring, $t$, Fig. 5$^a$, acts to depress the lever and cause the pawl $s$ to rotate the index-wheel, and the spindle thereto attached, a distance equal to the space between each notch or tooth of the index-wheel and the next notch or tooth. Each index-wheel is provided with a spring-latch, $u$, Figs. 4 and 5, which automatically locks the index-wheel and its spindle in each position to which they are rotated. Each latch $u$ is disengaged from its index-wheel just before the latter is rotated by a fixed projection, $v$, affixed to the bed $a$, there being a series of projections $v$, corresponding in number to the projections $o$, and located close to the latter, as shown.

In addition to the step-by-step rotary movements given to the spindles, as last described, said spindles are reciprocated lengthwise by the reciprocating movements of the slides $d$ in their guides $c$. Said movements are effected by a series of rock-shafts, $w$, Figs. $2^a$, $2^b$, and 3, journaled in the carriage $b$, one under each slide $d$, arms $a'$ $b'$, attached to the opposite ends of said rock-shaft, one of said arms bearing against a stud or screw, $c'$, projecting from the bottom of the corresponding slide, $d$, a series of fixed projections, $d'$, formed on a ring, $e'$, affixed to the bed $a$, and bearing against anti-friction rollers on the arms $a'$, and springs $f'$, Fig. 2, arranged to press the slides $d$ inwardly toward the center of the carriage $b$, and thus hold the arms $a'$ with a yielding pressure against the perimeter of the ring $e'$. The rotary motion of the carriage causes the arms $a'$ to move along the perimeter of the ring $e'$, and the springs $f'$ cause the arms $a'$ to bear continuously against the projections $d'$, said arms, with the rock-shafts $w$ and arms $a'$ $b'$, being thereby oscillated and caused to reciprocate the slides $d$.

The described mechanism is so timed that each pinion-blank, after being given one movement each way in the direction of its length, is rotated one step before it is again reciprocated.

$i$ $i$ $i$ represent a series of cutter-carrying arbors journaled in bearings supported by the rotary carriage $b$ and arranged at right angles with the spindles $e$. Said arbors are continuously rotated by the belts K, before mentioned, said belts running on pulleys $g'$, affixed to the arbors $i$, and each is provided at one end with a series of (preferably) three cutters, $h'$ $i'$ $j'$, Figs. 20, 21, and 22, which act successively in forming teeth on the pinion-blanks, the first cutter, $h'$, forming a slot in the blank, the second, $i'$, enlarging said slot and giving its sides an approximation to the form of the adjacent sides of two pinion-teeth, and the third, $j'$, giving said sides their final shape. The arbors $i$ are movable laterally, to enable their cutters to be presented to and removed from the pinion-blanks, and are also movable longitudinally, to enable the cutters to act successively on the same pinion-blank. To provide these movements I prefer to journal each arbor in bearings attached to frames $j$, affixed to rods or shafts $l'$, which are journaled and adapted to move lengthwise in bearings $m'$ $m'$, affixed to the rotary carriage. The arbors are in this instance arranged with their cutters under the pinion-blanks to be cut, so that the cutters are caused to enter the blanks by an upward motion of the frames $j$, this motion being caused by a spring, $n'$, Fig. 9, pressing upwardly the swinging ends of the frames $j$, and limited by adjustable stop-screws $o'$ in arms or brackets $p'$ on the carriage $b$. The cutters are depressed and so moved away from the blanks by the action of a series of fixed projections, $r'$, on the bed $a$, and a series of slides, $s^4$, Fig. 9, movable in sockets in the rotary carriage, said projections being, for convenience of construction, formed on a ring, $q'$, affixed to the bed $a$. Said slides are provided with anti-friction rollers $s'$ at their inner ends, bearing against the projections $r'$, and bear at their outer ends against arms $t^4$, affixed to and projecting downwardly from the frames $j$. As the roller of a slide, $s^4$, encounters a projection, $r'$, said slide is forced outwardly by the projection, and thus caused to swing the arm $t^4$ and depress the swinging end of the frame $j$, which said slide accompanies.

The shafts $l'$, to which the cutter-arbor-carrying frames are affixed, are movable endwise, as already stated, and each is pressed by a spring, $k$, interposed between one of its bearings and the frame $j$, against one of a series of three stops, $u^4$ $u^5$ $u^6$, Figs. 8, 18, and 19, there being a like series of stops for each shaft. Said stops are arranged to arrest the shaft $l'$ and its attachments (including the cutters) at different points, the stop $u^4$ being arranged to hold the shaft with the first cutter, $h'$, in position to act on a pinion-blank, while the second stop, $u^5$, and third stop, $u^6$, are arranged, respectively, to hold the shaft with the second and third cutters in operative position. The stops are movable laterally in a series, so that they are brought successively into position to arrest the shaft $l'$. To this end the three stops of each series are supported in the swinging end of an arm, $v'$, Figs. 18 and 19, which is pivoted at its other end to an ear, $w'$, on the rotary carriage $b$, and is normally depressed by a spring, $a^2$. To each arm $v'$ is connected a pin, $b^2$, which passes downwardly through the carriage $b$. On the bed $a$ are two fixed projections, $c^2$ $d^2$, Figs. 3, 18, and 19, into contact with which each pin $b^2$ is brought successively by the rotary motion of the carriage. When a pin, $b^2$, encounters the first projection, $c^2$, it is raised by said projection and swings upwardly the arm $v'$, thereto connected, far enough to remove the first stop, $u^4$, from its shaft-arresting position and bring the second stop, $u^5$, into said position. When the pin $b^2$ encounters the second projection, $d^2$, it is further raised thereby, and thus the third stop, $u^6$, is brought into position to arrest the shaft $l'$. The shaft $l'$ is moved endwise by its spring $k$ at each change of position of the stops, and thus the longitudinal position of the arbor $i$ is changed to present each cutter thereon successively to the pinion-blank.

Three of the stops $o'$, which limit the upward movement of the cutters, are provided for each cutter-arbor-carrying frame $j$, and said frame has three studs or bosses, $o^4$, one for each stop $o'$. Said stops and bosses are so arranged that one stop and the corresponding boss limit the upward movement of the frame $j$ when the first cutter is in position, another when the second cutter is in position, and the third when the third cutter is in position. This arrangement is adapted to obviate the necessity of making all the cutters of exactly the same diameter, the stops $o'$ being independently adjustable, so that in case any cutter is smaller or larger than the others the stop $o'$, which limits the upward movement of that cutter, may be adjusted to compensate for such variation.

After the last cutter, $j'$, has acted on the pinion-blank the shaft $l'$ and its attachments are moved back to the starting position by the encounter of a bell-crank lever, $e^2$, pivoted to the rotary carriage $b$, with a projection, $f^2$, on the bed $a$, one arm of said lever bearing against the arm $t^4$ on the swinging frame $j$, as shown in Fig. 8. The projection $f^2$ turns the lever $e^2$ on its pivot $g^2$, and causes its arm that bears against the arm $t^4$ to move the frame $j$ and shaft $l'$ away from the stop-carrying arm $v'$, and thus allow said arm to be depressed and bring its first stop into operative position.

Following the course of each pinion-blank after it is inserted in a spindle, $e$, it will be seen that the blank is carried continuously along by the rotation of the carriage, and is alternately rotated and locked by the fixed projections $o$ and $v$ and the index and locking mechanism, Fig. 5, co-operating therewith. After each partial rotation of the blank it is moved along by the inward movement of the slide $d$, and is thus subjected to the action of the first cutter, $h'$, the arbor $i$, carrying said cutter, being raised to allow the cutter to act during this movement of the blank, and depressed by the devices shown in Fig. 9, so as to clear the blank during the return movement of the latter. These movements are repeated until the first cutter, $h'$, has formed the entire number of slots required for the incipient teeth on the pinion-blank.

After the cutting of the full number of teeth by the first cutter, the arm $v'$, carrying the stops $u^4$ $u^5$ $u^6$, which successively determine the longitudinal position of the cutter-arbor, is raised by the encounter of the pin $b^2$ on said arm with the fixed projection $c^2$, and thus the second stop is brought into position, and the cutter-arbor is moved along by its spring $k$ to the second stop, $u^5$, the second cutter being thus brought into acting position and caused to enlarge the slots already formed in the blank, as shown in Fig. 21. After the second cutter has performed its work on the pinion-blank, the stop-carrying arm $v'$ is further raised by the contact of its pin $b^2$ with the second projection, $d^2$, which brings the third and shortest stop, $u^6$, into position, and allows the cutter-arbor to move against said stop, and thus bring the third or finishing-cutter, $j'$, into position to act on the pinion-blank, as shown in Fig. 22. Said cutter acts on the blank in the same way that its predecessors acted, and completes the pinion-teeth. After the finishing-cutter has completed its work, the cutter-arbor is moved back to its starting position by contact of the right-angled lever $e^2$ with the fixed projection $f^2$, the stop-carrying arm $v'$ being thus allowed to spring downwardly to bring its first stop into position, as shown in Fig. 18.

After the completion of the teeth on the pinion held by the spindle, whose course has been above described, an arm, $o^2$, Figs. 3, 16, and 17, on a rock-shaft, $p^2$, journaled in the carriage $b$, strikes an incline, $r^3$, on a block, $q^2$, affixed to the bed $a$, and is swung thereby so as to turn the rock-shaft and cause an arm, $r^2$, on the upper end of said rock-shaft to draw the tail-stock spindle $h$ positively away from the completed pinion held in the spindle $e$, the arm $r^2$ having a stud, $s^2$, which engages with collars $t^2$ $t^2$ on the spindle $h$, as shown in Figs. 16 and 16$^a$. Said stud is attached to the free end of a spring, $s^5$, Fig. 16$^a$, which is attached at $s^6$ to the arm $r^2$, and bears against one side of said arm. The stud $s^2$ therefore yields in one direction and moves positively in the other, the positive motion withdrawing the tail-stock spindle, while the yielding movement pushes the spindle to force the pinion-blank into the head-stock spindle.

Simultaneously with, or immediately following, the withdrawal of the tail-stock spindle, a projection, $h^2$, on the carriage (shown in Fig. 7 and by dotted lines in Fig. 3) strikes an arm, $i^2$, affixed to the inner end of a rod, $j^2$, which is adapted to slide in guides in the bed $a$, and moves said arm and rod inwardly, thereby compressing a spring, $s^3$, on said rod, and causing the rod to swing outwardly the long arm of a lever, $k^2$, which is jointed at its lower end to said rod and is pivoted at $l^2$ to an ear on the bed. When the projection $h^2$ on the carriage passes the arm $i^2$, the compressed spring $s^3$ forces the rod $j^2$ outwardly, causing the rod to swing the upper end of the lever $k^2$ inwardly, a head, $m^2$, on said lever being thus caused to strike and move inwardly a push-pin, $n^2$, in the spindle $e$, and thereby eject the completed pinion from said spindle, the tail-stock spindle being meanwhile held back by the edge of the block $q^2$ having the withdrawing incline $r^3$.

As soon as the finished pinion is discharged a new blank is supplied to the same spindle by a rack or hopper, $w^2$, attached to an oscillating arm, $v^2$, which is pivoted at $v^3$ to a standard, $u^2$, on the carriage $b$. To the arm $v^2$ is attached a lever, $a^3$, which extends downwardly through a slot, $b^3$, in the carriage $b$, and encounters a fixed projection, $c^3$, on the bed after the completed pinion has been ejected from the spindle $e$, which the hopper $w^2$ accompanies. Although I have shown but one hopper in Fig. 1, it will be understood that a hopper is provided for every spindle. The contact of the lever $a^3$ with the projection $c^3$ moves said lever and the hopper from their normal position (shown in dotted lines in Fig. 10) to the position shown in full lines in said figure, thus depressing the hopper until two forked arms, $d^3$ $d^3$, bear upon the head and tail stocks, and the lower end, $e^3$, of the hopper is interposed between the head-stock spindle $e$ and the tail-stock spindle $h$. Said lower end has two spring-jaws, $f^3$, (shown in section in Figs. 13 and 14,) the inner edges of which have cavities at their lower ends adapted to hold the lowest blank, $g$, in the hopper slightly separated from the one above it and in line with the spindles $e$ $h$, its position with reference to said spindles being determined by the forked arms $d^3$ bearing on the head and tail stocks. While the hopper is held in this position the tail-stock spindle is moved outwardly by an incline, $r^4$, on the inner block, $q^2$, Figs. 3 and 17, said incline swinging the rock-shaft $p^2$, and causing its upper arm, $r^2$, to force the tail-stock spindle $h$ outward with a somewhat yielding pressure, due to the spring $s^5$, supporting the stud $s^2$, as described above, the tail-stock being normally held in the position to which it is thus forced by a spring, $q^3$, Fig. 2.

The staff of the lowest pinion-blank held by the cavities of the jaws $f^3$ $f^3$ is by the positive outward movement of the spindle $h$ forced into the socket in the spindle $e$. Immediately after this the lever $a^3$ is carried by the rotation of the carriage beyond the projection $c^3$, and is forced by a spring, $h^3$, back to its normal position, (shown in dotted lines in Fig. 10,) thus raising the hopper $w^2$. The jaws $f^3$ are caused to open slightly in being drawn off from the pinion which is held by the spindle $e$, their opening being sufficient to allow the next pinion-blank to drop between the cavities of the jaws. When the jaws have cleared the held blank, they close and the cavities grasp the lowest blank, separating it slightly from the next above, so that the lowest blank is ready to be presented to the accompanying spindles when the rotation of the carriage again brings the operating-lever $a^3$ of the hopper around to the fixed projection $c^3$.

It will be remembered that there is a plurality of organizations for inserting, holding, cutting, and releasing a pinion-blank, each organization being a duplicate of that whose operation has been above described, and each performing the entire operation of forming the teeth on a pinion during a complete rotation of the carriage. Several pinion-blanks are therefore being cut at the same time when the machine is in operation, and the entire work is performed automatically, the machine requiring no attention other than the supplying of the hoppers with blanks and the removal from the carriage of the ejected pinions from time to time, whenever necessary, ordinary care—such as keeping the parts lubricated and in good running order—being of course excepted.

No stoppage of the machine is required for the removal of the completed pinions and the insertion of fresh blanks, and no time is lost by moving the blanks from one cutter to another, as in other machines.

The projections $o$ and $v$, which operate the indexing mechanism, are equal in number to the number of teeth to be cut in each pinion multiplied by the number of cuts required to form each tooth. For instance, a twelve-tooth pinion, each tooth of which is formed by the successive operation of three cutters, requires thirty-six movements of the indexing mechanism. Pinions having less than twelve teeth may, however, be cut at the same time on any one of the slides $d$ with no change in any of the mechanism, excepting the indexing devices. The various cutters would in such case pass through some of the spaces or slots a second time, but of course without cutting. Neither of the series of projections $o$, $d'$, and $r'$ on the bed $a$ is continuous, the continuity of each series being broken by plain surfaces, as shown in Fig. 3, the flange $n$, on which the index-operating projections $o$ are formed, having a plain surface, $g^3$, while the ring $e'$, on which are the projections $d'$, operating the slide-moving levers $a'$, has a plain surface, $g^4$, and the ring $q'$, on which are the projections $r'$, operating the cutter-arbor-depressing devices, has a plain surface, $g^5$. These surfaces, which are all arranged at one side of the center of the bed $a$, make the several devices above named inoperative during the operation of the mechanism employed for ejecting the finished pinions and supplying the uncut blanks, the spindles being prevented from rotating by the surface $g^3$, while the slides $d$ are prevented from reciprocating by the surface $g^4$, and the cutter-arbors are held depressed, with their cutters away from the pinion-blanks, by the surface $g^5$. To insure steadiness of the rotary movement of the turret, the projections $o$, $d'$, and $r'$ are so spaced as that no two slides are synchronous in their movement toward the center of the table or in their movements in the contrary direction, the movements of each slide being slightly out of time with those of the others of the series.

It is evident that various modifications might be made in the details of construction of the machine without departing from the spirit of my invention. For instance, the cutters may be moved to bring them successively into operative relation with the pinion-blank by an independent endwise movement of the cutter-spindle in its supporting-frame, instead of by a movement of the frame and spindle, as above described.

The cutters of each series may be placed on separate spindles, each series being held in a rotary head or drum, instead of all being side by side on a single spindle, although I prefer the latter. It is not essential that the reciprocating slides $d$ be exactly radial, as they may be set at any desired angle, or may be arranged tangentially.

For convenience I shall in the following claims designate the cutters $h'$ $i'$ $j'$ accompanying each blank-holding spindle as a group or set and the whole number of such groups or sets as a series.

I do not in this application claim, broadly, the combination, with pinion-cutting mechanism, of automatic blank feeding or supplying mechanism, as the same was invented jointly by Duane H. Church and myself, and will be made the subject of a joint application.

I claim—

1. In a pinion-cutting machine, the combination of a rotating carriage, a series of slides reciprocated on said carriage, pinion-holding spindles supported by said slides and rotated step by step, and a corresponding series of groups or sets of rotating cutters, the cutters of which successively act intermittingly on the pinion-blanks held by the spindles, each group of cutters operating on one blank only during one rotation of the carriage, as set forth.

2. In a pinion-cutting machine, the combination of a continuously-rotating carriage, a series of slides reciprocated on said carriage, pinion-holding spindles supported by said slides and rotated step by step, a corresponding series of groups or sets of rotating cutters, the cutters of which successively act intermittingly on the pinion-blanks held by the accompanying spindles, each group of cutters performing the entire operation of cutting the teeth of a single pinion during one rotation of the carriage, means for temporarily stopping the reciprocating movements of the slides, means for temporarily stopping the step-by-step rotary movements of the spindles, and means for temporarily stopping the intermitting movements of the cutters after the cutting of the teeth on the blanks held by the spindles, and thereby affording time for the removal of the completed pinions and the insertion of uncut blanks without stopping the rotation of the carriage, as set forth.

3. In a pinion-cutting machine, the combination of a continuously-rotating carriage, a series of slides reciprocated on said carriage, pinion-holding spindles supported by said slides and rotated step by step, a corresponding series of groups or sets of rotating cutters, the cutters of which successively act intermittingly on the pinion-blanks held by the accompanying spindles, each group of cutters performing the entire operation of cutting the teeth of a single pinion during one rotation of the carriage, means for temporarily stopping the reciprocating movements of the slides, means for temporarily stopping the step-by-step rotary movements of the pinion-holding spindles, means for temporarily stopping the intermitting movements of the cutters after the cutting of the pinion-teeth, and means for ejecting the completed pinions from the spindles, as set forth.

4. In a pinion-cutting machine, the combination of a continuously-rotating carriage, a series of slides reciprocated on said carriage, pinion-holding spindles supported by said slides and rotated step by step, a corresponding series of groups or sets of rotating cutters, the cutters of which successively act intermittingly on the pinion-blanks held by the accompanying spindles, each group of cutters performing the entire operation of cutting the teeth of a single pinion during one rotation of the carriage, means for temporarily stopping the reciprocating movements of the slides, means for temporarily stopping the rotary movements of the spindles, means for temporarily stopping the intermitting movements of the cutters after the cutting of the pinion-teeth, means for ejecting the completed pinions from the spindles, oscillating racks or hoppers to contain pinion-blanks, means for presenting said racks to the spindles after the ejection of the completed pinions, tail-stock spindles and operating devices therefor, whereby blanks are forced from the racks into the blank-holding spindles, and means for withdrawing said racks from the spindles, as set forth.

5. In a pinion-cutting machine, the combination of a continuously-rotating carriage, a plurality of slides thereon having pinion-holding spindles, and mechanism, substantially as described, whereby said slides are so reciprocated that no two slides are moved synchronously in the same direction, as set forth.

6. The combination of the rotary turret or carriage, means for continuously rotating the same, a series of slides on the carriage having pinion-blank-holding spindles, a corresponding series of continuously-rotated groups or sets of cutters carried by the carriage, a fixed bed under the carriage, indexing mechanism, substantially as described, supported in part by the bed and in part by the carriage, whereby the spindles are rotated step by step, and mechanism, substantially as described, also supported in part by the bed and in part by the carriage, whereby the slides are reciprocated, as set forth.

7. The combination of the rotary carriage or turret, means for continuously rotating it, a series of slides on the carriage having pinion-blank-holding spindles, a fixed bed under the carriage, devices, substantially as described, whereby the said slides are reciprocated and their spindles rotated step by step, a series of cutter-arbors supported by the carriage and movable both laterally and longitudinally, each arbor having a group of cutters, mechanism, substantially as described, whereby the longitudinal position of each arbor is changed at stated intervals to bring the cutters of the group it carries successively into operative position, and mechanism, substantially as described, whereby each arbor is reciprocated laterally to cause its operating-cutter to act intermittingly on the pinion-blank, as set forth.

8. The combination of the rotating carriage, the slides $d$ thereon, the pinion-holding spindles on the slides, the index-wheels on the spindles, the pawl-carrying arms $r$, mounted on said spindles, the levers $p$ and latches $u$, pivoted to the slides, connections between the levers $p$ and $r$, and the fixed bed having the series of projections $o$ and $v$, whereby the index operating and locking devices are operated, as set forth.

9. The combination of the rotating carriage, the slides $d$ thereon, having the pinion-holding spindles and the springs $f'$; the rock-shafts $w$, journaled in the carriage and having the arms $a'$ $b'$, the latter engaged, as described, with the slides $d$, and the fixed bed $a$, having the series of fixed projections $d'$, which co-operate with the rock-shafts $w$ and springs $f'$ in reciprocating the slides, as set forth.

10. The combination of the bed $a$, the rotating carriage $b$, the reciprocating slides $d$ on said carriage, having the pinion-holding spindles, the indexing mechanism, whereby said spindles are rotated step by step, the cutter-arbors, each having a group or set of cutters, the frames $j$, supporting said arbors and adapted to oscillate vertically and move laterally, the springs $k$, which move said frames, the stops $o'$, whereby the upward movement of the frames $j$ is limited, the movable series of stops $u^4$ $u^5$ $u^6$, accompanying the frames $j$, mechanism, substantially as described, for moving the series of stops at stated intervals and thereby allowing the springs $k$ to change the position of the frames $j$, and mechanism, substantially as described, for vertically oscillating said frames and thereby causing the operating-cutters to act intermittingly on the pinion-blanks, as set forth.

11. The combination of the fixed bed, the continuously-rotating carriage, the reciprocating slides on said carriage, the step-by-step rotated spindles on said slides, having the push-pins $n^2$, the mechanism whereby the slides are reciprocated and the spindles rotated, the sets or groups of cutters, means, substantially as described, for operating said cutters, the ejecting-lever $k^2$, pivoted to the base, the slide $j^2$, jointed to said lever and having the arm $i^2$, the series of projections $h^2$ on the carriage, acting successively on the arm $i^2$ to swing the ejecting-lever outwardly, and the spring $s^3$, whereby said lever is forced inwardly against the push-pin of each spindle in succession, as set forth.

12. The combination of the fixed bed, the continuously-rotating carriage, the reciprocating slides on said carriage, the step-by-step rotated spindles $e$ on said slides, the devices whereby the slides are reciprocated and the spindles rotated step by step, the tail-stock spindles $h$ in said slides, the rock-shafts $p^2$, journaled in the carriage and having the yielding arms $r^2$ at their upper ends engaged with the spindles $h$ and the arms $o^2$ at their lower ends, and the blocks $q^2$ $q^2$, affixed to the base $a$ and formed to turn each rock-shaft in opposite directions and cause the arms $r^2$ of the rock-shafts to alternately withdraw and project the tail-stock spindles, as set forth.

13. The combination of the fixed bed, the rotating carriage, the slides, spindles, and cutters on said carriage, the blank-holding racks or hoppers having the forked arms $d^3$ $d^3$, the oscillating arms $v^2$, supporting said racks and pivoted to standards on the carriage, the levers $a^3$, attached to said arms, the fixed projection $c^3$ on the bed, whereby the levers $a^3$ are moved successively to depress the racks, and the springs $h^3$, whereby said racks are raised, as set forth.

14. The combination of the fixed bed having a plurality of series of projections or inclines, the continuously-rotating carriage having the slides, the blank-holding spindles and the series of sets or groups of cutters, and mechanism, substantially as described, supported by the carriage and co-operating with the series of projections on the bed in reciprocating the slides, rotating the spindles step by step, and giving the groups of cutters the described movements, whereby cutters of each group are caused to successively act intermittingly on the blank of the accompanying spindle, as set forth.

15. The combination of the fixed bed having a plurality of series of projections or inclines, the continuously-rotating carriage, the slides, the blank-holding spindles on the slides, having the push-pins, the series of sets or groups of cutters, mechanism, substantially as described, on the carriage, co-operating with the projections on the bed in reciprocating the slides, rotating the spindles step by step, and giving the groups of cutters the described movements, the plane surfaces interrupting the continuity of the fixed projections on the bed, whereby the movements of the slides, spindles, and cutters are suspended at a given point in the rotation of the carriage, and the pinion-ejecting mechanism, whereby the push-pins of the spindles are moved inwardly while the operative movements of the spindles are arrested, as set forth.

In testimony whereof I have signed my name to this specification, in the presence of two subscribing witnesses, this 1st day of December, 1886.

EDWARD A. MARSH.

Witnesses:
C. F. BROWN,
A. D. HARRISON.